Dec. 26, 1939.  H. S. FROMHART  2,184,715
WARNING SIGNAL FOR AIR BRAKES
Filed June 21, 1937
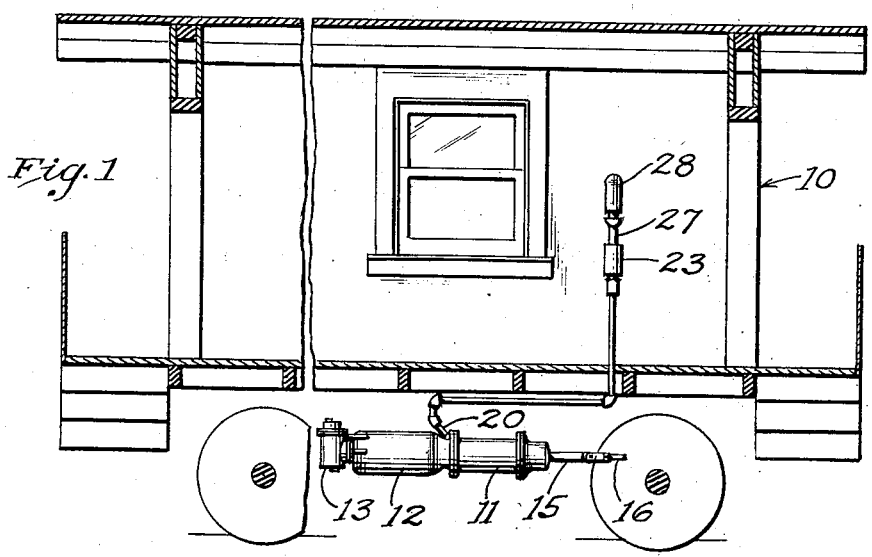
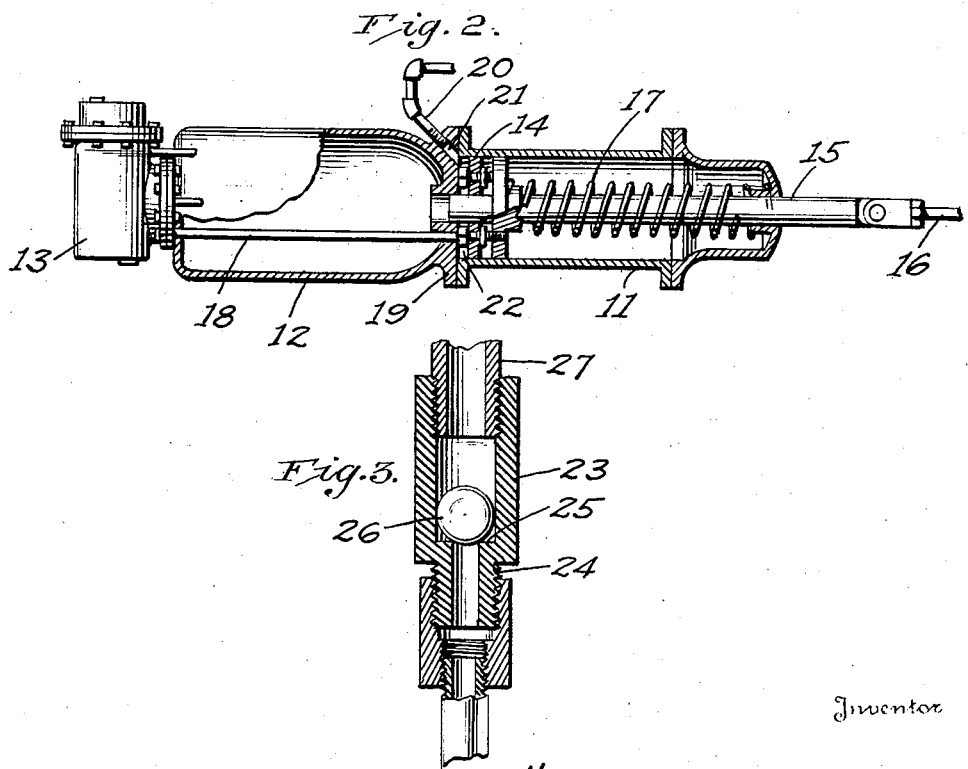
Inventor
Herman S. Fromhart
By Whittemore, Hulbert & Belknap
Attorneys Patented Dec. 26, 1939

2,184,715

UNITED STATES PATENT OFFICE 2,184,715

WARNING SIGNAL FOR AIR BRAKES

Herman S. Fromhart, Kamloops, British Columbia, Canada

Application June 21, 1937, Serial No. 149,491

3 Claims. (Cl. 116—55)

The present invention relates to alarms and more particularly to a signal device associated with the air brake system of a railway train, the device being located in the caboose or rear car of the train.

It is well known that in long freight trains the cumulative slack between cars is such that when the brakes are applied and the locomotive brought to a full stop, the slack is taken up and results in a rather sudden and severe jar to the rear cars. Frequently trainmen occupying the caboose are not prepared for this jar and are thrown against the walls of the caboose. As a consequence, the trainmen are often injured, sometimes seriously.

It is one of the objects of this invention to provide an audible alarm or signal in the caboose or in a car remote from the locomotive and so connected with the brake system that it will be actuated when the pressure in the air line is reduced to operate the triple valves.

It is a further object of the invention to provide a valve which permits the signal to be operated for a brief period but which will then close the signal piping so as not to interfere with brake actuation.

Further objects will be apparent from the following description of the device taken in connection with the accompanying drawing, in which:

Fig. 1 is a side elevation of the signal and brake application mechanism shown on a caboose, parts thereof being in section and broken away for clarity;

Fig. 2 is a section through the brake cylinder, showing the manner in which the signal piping is connected thereto; and Fig. 3 is a section through a check valve employed in the device.

Referring to the drawing, the invention is illustrated as applied to the caboose of a railway train. The caboose is indicated at 10, and, as will be seen, there is supported beneath the caboose the usual air brake apparatus with which the train is equipped comprising a brake cylinder 11, auxiliary reservoir 12 connected thereto, and triple valve 13. Within the cylinder is a piston 14 and piston rod 15, the latter having a connection with the brake rod 16. Normally the piston is held in brake releasing position by a spring 17 within the cylinder. It will be understood that, when the engineer's valve is open, the air pressure in the system is reduced, whereupon the triple valve is actuated to admit air from reservoir 12 to cylinder 11 through pipe 18. Piston 14 is then forced to the right in Fig. 2 to overcome spring 17 and the brakes on the caboose are applied.

As will be seen in Fig. 2, piston 14 is normally spaced a short distance from that end of the cylinder connected to the auxiliary reservoir. Flange 19 on the reservoir is drilled and tapped to receive pipe 20, the bore 21 communicating with the space 22 between the piston and the end of the reservoir. Pipe 20 is connected by suitable couplings and piping to a valve cylinder 23, the lower end of which is reduced at 24 to form a shoulder seat 25 for ball check valve 26. The upper end of cylinder 23 is tapped to receive pipe 27, the lower end of which also forms a seat for ball valve 26 when the latter is raised by increased air pressure in the pipe connections. Pipe 27 is connected to and is in communication with an audible alarm 28 which, in the present instance, is shown as a whistle.

From the foregoing description it will be apparent that, when the air pressure in the brake system is reduced, the triple valve will admit air to the brake cylinder and, at the same time, to the piping connected with the whistle. The increased air pressure in the piping will lift valve 26 from its seat 25 and raise it into seating relation with the lower end of pipe 27. While the valve is being lifted the air thereabove is forced through pipe 27 whereby the whistle is blown to indicate to the occupants of the caboose that the brakes have been applied. After the valve is seated against pipe 27, further escape of air from the brake cylinder into the pipe connections for the whistle is inhibited.

It will be understood that, when, for instance, the engineer's valve is operated, the locomotive comes to a stop in a relatively short time. On the other hand, the cars of the train, particularly those at the rear end thereof, travel a greater distance after brake application, due to the slack in the couplings. It often requires as much as six or eight seconds for this slack to be taken up after the locomotive has come to a complete stop. Obviously, since the signal operates within a short time after the locomotive brakes have been applied, the occupants of the caboose have ample time to set themselves for the shock that accompanies the "running in" of the slack.

While a preferred form of the invention has been illustrated and described, it is intended that the same be modified, if desired. In its broad sense, the invention is defined in the appended claims.

Having described my invention, what I claim as new and desire to secure by Letters Patent is:

1. In combination with the brake cylinder of a railway brake system, brake operating means in said cylinder, a reservoir for air under pressure, means for controlling admission of air from said reservoir to said cylinder to move said brake operating means to brake applying position, an air operated audible whistle, a conduit connecting said whistle with said cylinder to supply said whistle with air under pressure admitted to said cylinder from said reservoir, said whistle being operable simultaneously with the admission of air to said cylinder when brake application is initiated, and means for interrupting operation of said whistle during brake application.

2. In combination with the brake cylinder of a railway brake system, brake operating means in said cylinder, a reservoir for air under pressure, means for controlling admission of air from said reservoir to said cylinder to move said brake operating means to brake applying position, an air operated audible whistle, a conduit connecting said whistle with said cylinder to supply said whistle with air under pressure admitted to said cylinder from said reservoir, said whistle being operable simultaneously with the admission of air to said cylinder when brake application is initiated, and means in said conduit for controlling the supply of air to said whistle.

3. In combination with the brake cylinder of a railway brake system, brake operating means in said cylinder, a reservoir for air under pressure, means for controlling admission of air from said reservoir to said cylinder to move said brake operating means to brake applying position, an air operated audible whistle, a conduit connecting said whistle with said cylinder to supply said whistle with air under pressure admitted to said cylinder from said reservoir, said whistle being operable simultaneously with the admission of air to said cylinder when brake application is initiated, and valve means interposed in said conduit between said cylinder and said whistle for interrupting the supply of air to said whistle after a predetermined actuation thereof.

HERMAN S. FROMHART.